United States Patent [19]
Morreale

[11] Patent Number: 5,287,751
[45] Date of Patent: Feb. 22, 1994

[54] DRIVE LINK FOR GAS METER COUNTER ASSEMBLY

[75] Inventor: John D. Morreale, Houston, Tex.
[73] Assignee: Dresser Industries, Inc., Dallas, Tex.
[21] Appl. No.: 969,601
[22] Filed: Oct. 30, 1992
[51] Int. Cl.⁵ .............................................. G01F 15/02
[52] U.S. Cl. ................................... 73/861.01; 73/233
[58] Field of Search ............................. 73/861.01, 233; 192/48.1, 92, 56 R, 56 L, 99 A; 235/94 A

[56] References Cited
U.S. PATENT DOCUMENTS

| | | |
|---|---|---|
| 2,059,547 | 11/1936 | Brandl . |
| 2,093,151 | 9/1937 | MacLean . |
| 2,438,935 | 4/1948 | Marsh . |
| 2,791,118 | 5/1957 | Holtz . |
| 3,472,072 | 5/1967 | Kunstadt et al. .................. 73/233 |
| 3,581,566 | 6/1971 | Goff . |
| 3,969,939 | 7/1976 | Grzeslo .............................. 73/233 |
| 4,111,042 | 9/1978 | Bryant . |

Primary Examiner—Richard E. Chilcot, Jr.
Assistant Examiner—Harshad Patel

[57] ABSTRACT

The drive train of a computer mechanism of a counter assembly for a fluid meter includes a linkage assembly with a telescoping rod and sleeve connected between a crank and an input hub.

7 Claims, 2 Drawing Sheets

DRIVE LINK FOR GAS METER COUNTER ASSEMBLY

BACKGROUND OF THE INVENTION

1. Technical Field

This invention relates to a counter assembly for use in conjunction with a fluid meter to provide flow volume information corrected to a standard. In particular, the invention is concerned with an improvement in a portion of the drive mechanism for a mechanical computer arrangement contained within the counter assembly to provide for the correction of a measure of actual flow.

2. Background Information

Typically, meters used to measure the flow of gases, such as natural gas, measure in quantities of cubic feet. With natural gas being sold on a cubic foot basis it is important both from the supplier's standpoint and the consumer's standpoint that the heating value of each cubic foot purchased be constant. However, the heating value of a cubic foot of natural gas changes dependent upon both temperature and pressure. As a result, measured quantities of gas are corrected to standard cubic feet. A standard cubic foot is representative of an amount of gas which occupies a cubic foot of space at a standard temperature and pressure. Under normal service conditions, changes in the temperature of the gas are more dramatic and likely to have a much greater effect upon the correction to standard than are the changes in the pressure of the gas.

To provide for corrections due to temperature, gas meters include counters with mechanical computers which correct measured volumes of gas flow to standard. Generally, the way in which this is done is to convert the constant directional rotational motion of the meter rotors into oscillating arcuate motion and then to change the length of the arc based upon the difference in temperature from standard. A more detailed description of one form of counter employing the foregoing principle is described in U.S. Pat. No. 3,581,566. Another arrangement utilizing this same principle is disclosed in U.S. Pat. No. 3,969,939. As disclosed in this latter patent, the rotational motion of the output of the constant displacement rotors of the meter is converted by means of a crank wheel and lever link into an oscillating arcuate motion of a radial arm. An outer end of the arm, thus swings along an arcuate path. Positioned within the path is a cam surface whose location controls the length of the arc through which the end of the arm swings. The location of the can surface within the path changes dependent upon temperature, either lengthening or shortening the arcuate swing of the arm. The arm itself is attached to the input hub of a one-way clutch so that, when the end of the arm swings from a start position most distant from the cam surface toward the cam surface no relative motion is transmitted through the hub to an output shaft connected to a register. However, when the arm swings away from the cam surface, back toward its start position, rotational motion is transferred to the output shaft. The amount of rotation of the output shaft represents a gas flow volume through the meter corrected for temperature.

In driving the input hub, a lost motion spring connection is provided between the crank wheel and the input hub so that when the computer arm engages the temperature cam the crank can continue to rotate without parts in the drive connection to the input hub binding. One arrangement for this purpose is shown in U.S. Pat. No. 3,969,939 wherein a slot is provided in the link allowing the crank pin to slide within the link when further movement of the link at its connection to the computer arm is halted by the outer end of the arm engaging the cam surface.

SUMMARY OF THE INVENTION

The general aim of the present invention is to provide an improved computer mechanism for a fluid meter counter assembly of the foregoing general type which is more accurate and reliable over a longer service life. In one aspect of the invention, this is achieved by employing a novel yet simplified design of link between the crank and the input hub. Specifically, the link is of a more compact configuration and yet is still functional to accommodate overtravel when the computer arm strikes the temperature cam.

Invention also resides in the novel manner of fixing opposite ends of the link eccentrically and pivotally to the crank and the input hub, respectively, while also providing a resiliently-elongatable, intermediate section so that when the computer arm is out of contact with the temperature cam the link is maintained at a minimal length yet when in contact with the cam the link can elongate to accommodate overtravel.

Still further, the invention resides in the novel construction of the link including a telescoping sleeve and rod arrangement which during reciprocation of the link aids in the distribution of lubricant from adjacent the crank to the components of the computer mechanism between the crank and the input hub thereby to insure smooth and relatively wear free operation of the components.

The foregoing and other advantages of the present invention will become more apparent from the following description of the preferred embodiment when taken in conjunction with the accompanying drawings.

BEST MODE FOR CARRYING OUT THE INVENTION

Figure 1:
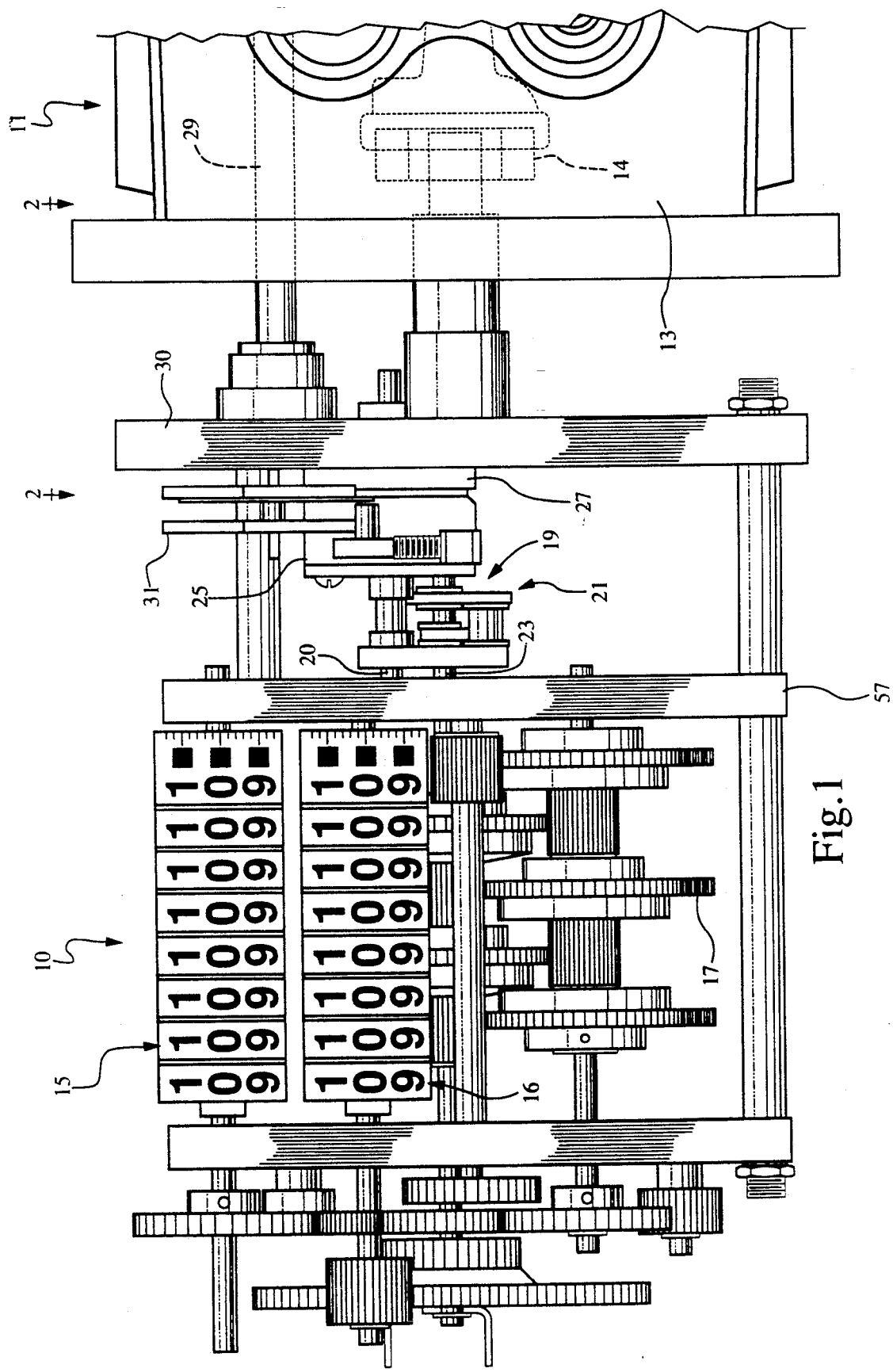
FIG. 1 is a plan view of the internal parts of a meter counter incorporating the novel features of the present invention.

As shown in the drawings for purposes of illustration, the present invention is embodied in a counter assembly 10 such as may be used in conjunction with a gas meter 11 to adjust the measurement of the actual volume of gas flowing through the meter to a standard volume measurement corrected to standard conditions, i.e. temperature and pressure. Connection to the meter 11 is shown generally in FIG. 1 with the counter assembly 10 attached to an end cover 13. Within the meter, two multi-lobe, fixed-displacement rotors (not shown) are rotated in opposite directions as gas flows through. The rotation of mating lobes of the rotors measures the actual volume of gas flowing through the meter. The counter assembly counts the number of rotations of the rotors and thereby provides a measurement of the amount of gas flowing through the meter.

Drive connection of the meter 11 to the counter assembly 10 is provided by a magnetic coupling 14 which connects an output shaft (not shown) of the meter to an input shaft (not shown) of the counter 10. Within the exemplary counter are two registers 15 and 16 driven by a gear train 17 connected to the input shaft. The register 15 provides an uncorrected reading of the actual volume of gas which has passed through the meter while the register 16 provides a reading corrected to a standard temperature volume.

Figure 2:
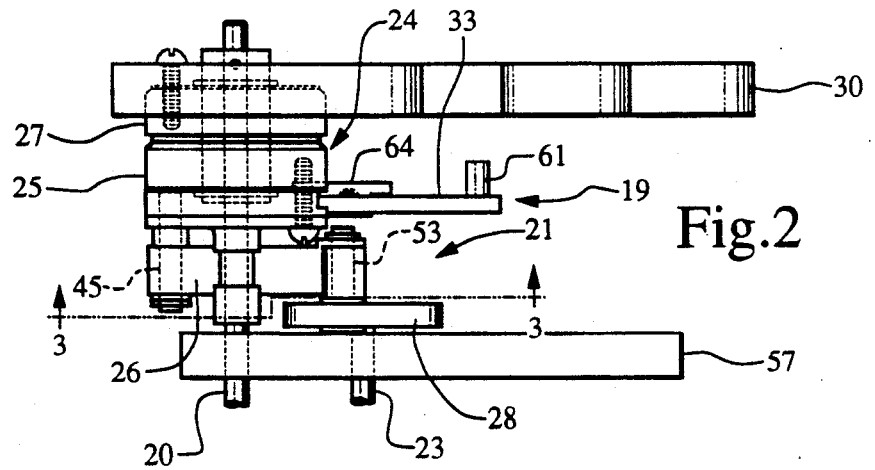
FIG. 2 is an elevational view of a portion the counter taken substantially along the line 2—2 in FIG. 1.
Figure 3:
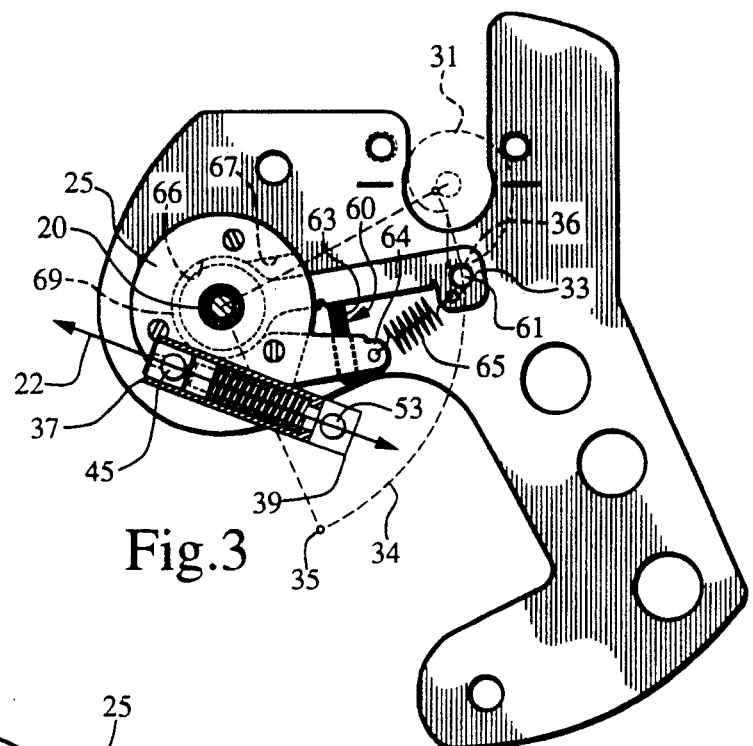
FIG. 3 is an enlarged view taken substantially along the line 3—3 shown in FIG. 2.

To correct for variations in gas volume due to temperature, the counter assembly 10 includes a computer mechanism 19 (see FIG. 2) operable to adjust the measured volume rotation of the input shaft to a standard volume rotation of an output shaft 20 which drives the register 16. More specifically herein, this is achieved through a four-bar linkage system 21 connected between a computer input shaft 23 driven by the gear train 17 and the computer output shaft 20. A one-way clutch unit 24 on the output shaft 20 is oscillated counterclockwise and clockwise by the linkage system. As shown in FIGS. 2 and 3, an input hub 25 of the clutch is connected to a link 26 in the linkage system and is reciprocated in the directions indicated by the double-ended arrow 22 (FIG. 3) by means of a crank 28 (FIG. 2). When the link 26 moves generally toward the right as viewed in FIG. 3, the input hub is drivingly rotated on the output shaft 20. As this occurs, a rear hub 27 (see FIG. 2) of the clutch holds the output shaft 20 against rotation. However, when the link advances generally to the left, the input hub grips the output shaft 20 driving it in a clockwise direction.

Adjustment for temperature is achieved by limiting the amount of rotation of the input hub 25 from its starting position in response to a sensed temperature. For this purpose, a bimetal probe 29 (see FIG. 1) is mounted on a support plate 30 adjacent the clutch unit 24 and is attached to a cam 31 which functions as a condition responsive stop to limit counterclockwise travel of the end of a computer arm 33 connected to the clutch input hub. The temperature sensed by the probe determines position of the cam 31 and hence the travel of the computer arm 33 along an arcuate path 34 (as indicated by the dashed line shown in FIG. 3) from its starting point 35. The temperature, of course, is variable dependent upon the temperature of the gas flowing through the meter. The cam 31 thus serves to limit travel of the arm at one end of the arc 34 and, in turn, any further counterclockwise rotation of the input hub 25 when the arm abuts the cam. When the input hub is rotated in a clockwise direction away from engagement with a temperature spot 36 on the cam by the four-bar linkage system, the input hub 25 grips the output shaft 20 causing it to rotate through the same length of arc which is traveled by the computer arm 33 in returning to is starting position 35. This distance represents a direct proportional conversion to a standard volume measurement of the volume of gas flowing through the meter 11 during one revolution of the crank 28.

Within the linkage system 21 is an overtravel spring-biased connection 38 (see FIG. 4) which provides for relative differences in travel between the corrected rotational output of the counter 10 and the uncorrected rotational input from the meter 11 when the computer arm 33 engages the temperature cam 31. To rotate the input hub 25, the computer input shaft 23 (see FIG. 2) serves as a crank shaft having the crank 28 (see FIG. 2) mounted thereon and connected by way of the link 26 to the input hub 25. When the link is reciprocated in the directions of the doubled-ended arrow 22, the input hub 25 reciprocates arcuately. Herein, the crank 28 is rotated by the shaft 23 continuously in a clockwise direction. When the link advances from its extreme right position toward the left as shown in FIG. 3, the input hub is rotated through a clockwise arc of approximately ninety degrees (90°).

In accordance with the present invention, the linkage assembly 21 includes a new and improved link 26 with opposite ends 37 and 39 and a resiliently elongatable intermediate section 40 which urges the opposite ends of the link toward each other so that link remains at its minimal length except when the computer arm 33 engages the temperature cam 31. For this purpose, the link comprises two telescoping parts 41 and 43 connected to each other by way of a spring 44 which urges the two parts together. Opposite ends of the link are secured pivotally yet eccentrically to the crank 28 and the input hub 25, respectively. Advantageously, when the link is reciprocated, the two telescoping parts also serve to help distribute lubricant to the moving parts of the computer mechanism 19, encouraging smooth operation of the mechanism while also reducing wear.

In the present instance, the link parts 41 and 43 are in the form of a tubular sleeve and a rod. As shown in FIGS. 2 and 3, one end of the sleeve 41 is journaled on a rocker pin 45 protruding from the side of the input hub 25. The pin 45 is held in a bore 46 (see FIG. 4) extending through an end plug 47 of the sleeve by a small snap ring (not shown). The end plug is pressed into the end of the sleeve and formed of an oil-impregnated powdered metal material to facilitate lubrication of the wear surfaces between the pin and the plug. The opposite end of the sleeve includes a small hole 49 through which a crank end portion 50 of the rod 43 extends. Attached to the crank end portion of the rod is a generally cylindrical head 51 which, in turn, is connected by a crank pin 53 to the crank 28 (FIG. 2).

In assembly of the rod 43 within the sleeve 41, an inner end portion 54 (see FIG. 4) of the rod protrudes through the opening 49 and is held within the sleeve by a capture ring 55. The latter is press fit onto the inner end of the rod. Urging the rod into the sleeve is the spring 44 which is compressed between the capture ring and the crank end of the sleeve. Preferably, the spring 44 is a light compression force spring having a low spring constant and therefore a substantially uniform spring force over its operating length. Thus, in use the compression spring applies a light load to the temperature cam 31 when engaged by the computer arm 33. In the exemplary form of the invention, the spring force is around nine ounces as measured along the link 26. This results in the application of a force of about two ounces to the cam.

Figure 4:
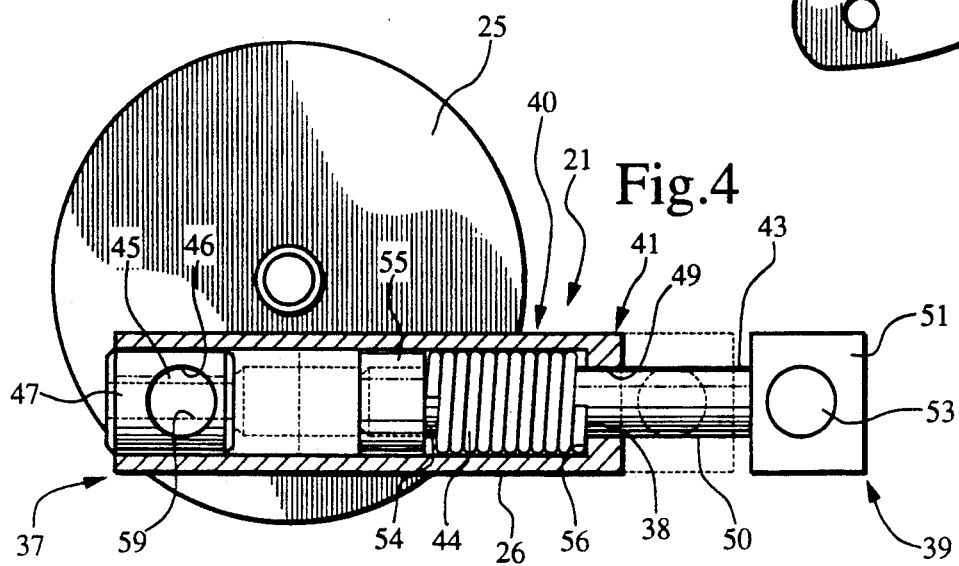
FIG. 4 is an enlarged view of parts of the drive train with certain parts shown in partial cross-section and others omitted for clarity of illustration.

Within the link 26, the spring 44 urges against an annular shoulder 56 which surrounds the opening 49. FIG. 4 illustrates a first position of the rod 43 in the sleeve 41 when the computer arm 33 is engaged with the temperature cam 31 at maximum overtravel. When the computer arm is disengaged from the cam, the spring 44 urges the link into the shortest configuration illustrated by the dotted line position shown in FIG. 4 with the head 51 of the rod abutting the crank end of the sleeve.

For improved lubrication of the input hub 25, the head 51, rod 43 and end plug 47 are all formed of an oil-impregnated powdered metal material. In the present counter assembly, oil migrates from a reservoir (not shown) along the shaft 23 (FIG. 2) of the crank wheel 28 into the area of the counter between two plates 30 and 57 on either side of the input hub 25 of the clutch 24. From there, oil on the crank pin 53 flows to the head 51 of the link rod 43 and onto the rod itself through the oil-impregnated powdered metal material. Oil from the rod is swabbed along the inside of the sleeve 41 and through an oil passage 59 (see FIG. 4) which extends axially through the end plug 47. The passage communicates with the rocker pin 45 and thus provides lubrication to the rocker pin and ultimately to the input hub and other clutch parts.

In operation of the exemplary link 26, advantage is also achieved by virtue of its compact length. This compactness comes from the fact that the maximum length of the link is provided only when needed and thus does not extend outside of the periphery of either of the crank 28 or the input hub 25 at any time during reciprocation of the link. In fact, both ends of the telescoping link are non-slidably but rotationally fixed to the input hub and the crank. Specifically, the link elongates when the computer arm 33 is in contact with the temperature cam 31, allowing the distance between rocker and crank pins 45 and 53 to become greater.

In accordance with another feature of the present invention, a unique connection is provided between the computer arm 33 and the input hub 25 enabling quick and easy adjustment of the length of the arc 34 traveled by the outer end of computer arm. For this purpose, the connection includes a mechanism 60 (see FIG. 3) which is carried by the input hub and is adjustable to set and hold the computer arm in a selected angular position relative to the input hub. As a result, the outer end 61 of the arm may be made to align precisely with the initial position 35 of the arc so that the arm always returns to the same position for the start of each oscillation. Advantageously, the adjustment in the position of the outer end occurs along the arc 34 and may be accomplished while the arm dwells on the cam. Thus, adjustment may be made even during operation of the meter.

As shown in FIG. 3, the connection for mounting the computer arm 33 onto the input hub 25 includes adjustable screw stop 63 secured to a generally tangentially extending leg 64 of the plate. The stop 63 abuts an undersurface of the computer arm 33 adjacent the outer end thereof to provide selected angular positioning of the computer arm on the input hub. A spring 65 connecting between the ends of the arm and leg urges the two together so that the computer arm and input hub function as a unitary member. At an inner end of the computer arm, a socket 66 is formed in the input hub including an angular notch 67 extending generally radially outward from the center of the hub. An inner end 69 of the computer arm is nested in the socket with the arm extending generally radially outward through the notch. Angular adjustment relative to the plate by means of the adjustable screw stop 63 is limited angularly by engagement with the sides of the notch.

In view of the foregoing, it will be appreciated that the linkage assembly 21 including the new link 26 of the present invention is more compact and provides for better lubrication than in prior arrangements. These features are primarily achieved by virtue of the telescoping sleeve 41 and rod 43 parts of the link providing for expansion of the middle portion link only when the computer arm 33 is in contact with the temperature cam 31 and at the same time helping pump lubricant to the input hub 25.

What is claimed is:

1. In a drive train of a computer mechanism of a counter assembly of a fluid meter wherein said train includes a crank connected to an input hub of a one-way clutch by a link reciprocable in opposite directions for oscillating the input hub in response to the flow of fluid through the meter
the improvement comprising,
said link being defined by
a generally cylindrical sleeve having opposite end portions one of which is pivotally pinned eccentrically to one of said crank and said input hub,
a rod with one end portion telescoped with the other of said opposite end portions of said sleeve and having an opposing end pivotally pinned eccentrically to the other of said crank and said input hub,
a spring connected within said sleeve between said sleeve and said rod and urging said sleeve and said rod together toward a predetermined minimum length, and
a stop between said rod and said sleeve limiting the telescoping together of said sleeve and said rod to said predetermined length when said link moves in one of said reciprocable opposite directions and said rod and sleeve being elongatable as a unit when said link moves in the other of said reciprocable opposite directions.

2. In the drive train as defined by claim 1, said spring being a compression spring.

3. A counter assembly for a fluid meter having an output shaft rotatable proportionally to the volume of fluid flow through the meter, said counter including
a support plate,
an input crank shaft supported adjacent said plate and drivingly connectable with said output shaft,
a computer mechanism connected to said plate, and
a readable register driven by said computer mechanism to provide corrected fluid flow volume information,
said computer mechanism having
a clutch shaft connected to said register and rotated proportionally to the corrected volume flow of fluid through said meter,
a one-way clutch unit including
an input hub mounted pivotally on said clutch shaft to drivingly release from and connect with said clutch shaft for unidirectional rotation thereof,
a computer arm pivotally connected to said input hub to swing back and forth through an adjustable length arc as said input hub pivots,
a temperature cam positionable in the arc of travel of said computer arm in response to changes relative to a preselected standard condition to adjust the length of the arc of travel of said arm relative to a standard length arc at said standard set condition,
a crank connected to said crank shaft, and
a drive link with one end pivotally connected to said crank and an opposite end coupled to said input hub and being reciprocally movable in response to rotation of said crank to reciprocally rotate said input hub,
said link comprising a generally cylindrical sleeve having opposite end portions one of which is pivotally pinned eccentrically to one of said crank and said input hub, a rod with one end portion telescoped with the other of said opposite end portions of said sleeve and having an opposing end pivotally pinned eccentrically to the other of said crank and said input hub, a spring connected within said sleeve between said sleeve and said rod and urging said sleeve and said rod together toward a predetermined minimum length, and a stop between said rod and said sleeve limiting the telescoping together of said sleeve and said rod to said predetermined length when said link moves in one of said reciprocable opposite directions and said rod and sleeve being elongatable as a unit when said link moves in the other of said reciprocable opposite directions.

4. A computer assembly as defined by claim 3 wherein said other end portion of said sleeve includes an annular shoulder surrounding an opening, said opposing end of said rod including an enlarged head which is pivotally pinned to the other of said crank and said input hub, said one end portion of said rod being telescoped into said sleeve through said opening and having a capture ring secured thereto within said sleeve, and said spring being a compression spring surrounding said one end portion of said rod and being sandwiched between said annular shoulder and said capture ring and urging said rod into said sleeve, said spring being compressed by elongation of said link when said computer arm engages said cam whereby said link provides an overtravel spring-biased connection to compensate for the change of travel distance of said computer arm from its standard length of travel.

5. A counter assembly for a fluid meter having an output shaft rotatable proportionally to the volume of fluid flow through the meter, said counter including a support plate, an input crank shaft supported adjacent said plate and drivingly connectable with said output shaft, a computer mechanism connected to said plate, and a readable register driven by said computer mechanism to provide corrected fluid flow volume information, said computer mechanism having a clutch shaft connected to said register and rotated proportionally to the corrected volume flow of fluid through said meter, a one-way clutch unit including an input hub mounted pivotally on said clutch shaft to drivingly release from and connect with said clutch shaft for unidirectional rotation thereof, a computer arm pivotally connected to said input hub to swing back and forth through an adjustable length arc as said input hub pivots, a temperature cam positionable in the arc of travel of said computer arm in response to changes relative to a preselected standard condition to adjust the length of the arc of travel of said arm relative to a standard length arc at said standard set condition, a crank connected to said crank shaft, and a drive link with one end pivotally connected to said crank and an opposite end coupled to said input hub and being reciprocally movable in response to rotation of said crank to reciprocally rotate said input hub, said link comprising a generally cylindrical sleeve having one end pivotally pinned to one of said crank and said input hub and an opening in the other end thereof with an annular shoulder surrounding said opening, a guide pin having an enlarged head pivotally pinned to the other of said crank and said input hub, an elongated rod with one end connected to said head and an opposite end portion telescoped into said sleeve through said opening, a capture ring secured to said opposite end portion within said sleeve, and a compression spring surrounding said opposite end portion and being sandwiched between said annular shoulder and said capture ring and urging said rod into said sleeve, said spring being compressed by elongation of said link when said computer arm engages said cam whereby said link provides an overtravel spring-biased connection to compensate for the change of travel distance of said computer arm from its standard length of travel.

6. A counter assembly as defined by claim 5 including an adjustable stop connected to said input hub and engagable with said computer arm for angular adjustment of said arm relative to said input hub, a spring connected between said computer arm and said input hub and urging said computer arm against said adjustable stop.

7. In a drive train of a computer mechanism of a counter assembly of a fluid meter wherein said train includes a crank connected to an input hub of a one-way clutch by a link reciprocable in opposite directions for oscillating the input hub in response to the flow of fluid through the meter the improvement comprising, said link having opposite ends with one of said ends being pivotally and eccentrically fixed to said input hub and the other of said ends being pivotally and eccentrically fixed to said crank, and a resiliently elongatable intermediate section urging said opposite ends toward each other.

* * * * *